United States Patent [19]

Logan

[11] Patent Number: 5,427,059
[45] Date of Patent: Jun. 27, 1995

[54] WASTE COLLECTING DEVICE FOR DOGS AND LIKE ANIMALS

[76] Inventor: Rudy Logan, 6361 Ross St., Philadelphia, Pa. 19144

[21] Appl. No.: 191,860

[22] Filed: Feb. 4, 1994

[51] Int. Cl.$^6$ .............................................. A01K 23/00
[52] U.S. Cl. ...................................... 119/95; 119/792
[58] Field of Search .................................. 119/95, 792

[56] References Cited

U.S. PATENT DOCUMENTS

| D. 229,321 | 11/1973 | Francis | 119/95 |
|---|---|---|---|
| 881,319 | 3/1908 | Holpuch | 119/95 |
| 1,175,773 | 3/1916 | Khoubesserian | 119/95 |
| 2,585,251 | 2/1952 | Kahlert | 119/95 |
| 4,510,887 | 4/1985 | Lincoln et al. | 119/95 |

*Primary Examiner*—John G. Weiss
*Attorney, Agent, or Firm*—Armand M. Vozzo, Jr.

[57] ABSTRACT

An improved waste collecting device is disclosed for dogs and like animals. The device comprises an adjustable harness constructed to fit about the torso of a variety of dog sizes having a back strap intended to extend from the neck to the rump area of the dog and a pair of lateral straps attached along the back strap to releasably fasten the harness about the neck and waist of the dog. A tail strap assembly is further provided on the harness and is adapted to be adjustably fastened along the rearward length of the back strap for holding a waste receptacle assembly in proper position. The waste receptacle assembly is fastened to bifurcated support straps around the tail of the dog and includes a disposable collection bag and a specially configured bag holder intended to support and maintain the bag in a position freely resting immediately adjacent to the dog's rectum. A semi-circular band of a semi-rigid material incorporated about the upper edge of the bag holder permits the holder to be fastened to the back strap in symmetrical fashion along the curved surface of the band with the flat surface thereof resting just beneath the rectum in a proper position comfortable to the dog.

7 Claims, 2 Drawing Sheets

WASTE COLLECTING DEVICE FOR DOGS AND LIKE ANIMALS

BACKGROUND OF THE INVENTION

The present invention relates to sanitary devices for animals and more particularly to an improved waste collecting device for animals, especially dogs, intended to collect feces from the animal and allow disposal thereof in a sanitary manner.

The collection and disposal of animal wastes and particularly those from pet dogs has become an increasing problem of public concern, especially in metropolitan areas. In cities and neighboring suburban communities, the problem has become especially acute since the pets are commonly walked in public areas. In such high population areas, pet wastes can accumulate on public walkways and park grounds, creating an unsightly and offensive environment not to mention a health hazard. In New York City alone, for example, there are more than 5 million dogs that collectively can accumulate some 175 tons of fecal matter each day, or the daily equivalent of 30 garbage trucks full. Obviously, such a massive amount of fecal material presents a major disposal problem which is compounded by the fact that most of the waste is deposited haphazardly by the animals.

In recent years a number of cities and suburban communities have passed ordinances requiring pet owners to clean up wastes deposited by their pets or face substantial fines. With the passage of such ordinances putting the responsibility squarely on the pet owners, a variety of products have developed that are designed to provide the pet owner with effective and sanitary means of waste disposal in the least offensive manner. These products include a number of pet septic disposal systems which act as repositories for waste material and provide for the addition of chemical agents, largely enzymes, to advance its decomposition. Another popular product involves a small shovel or scooper for picking up the wastes and transferring them into a small container or disposable bag. Both of these products can be troublesome and unpleasant to use, particularly the scooper which is required to be carried by the pet owner and used carefully in order to remove all of the wastes from the ground. Since it is designed for reuse, the scooper further should be cleaned following each use and as a result, pet owners often avoid its use rather than be forced to clean it.

Another type of device for dealing with this problem of animal wastes is one worn by the animal and designed to catch the animal wastes immediately upon discharge. Such devices typically include a harness which is strapped about the body of the animal and a receptacle designed for attachment to the harness in a position proximate to the anal region of the animal. These devices can effectively prevent animal wastes from contacting the ground and soiling interior surfaces and in so doing, can eliminate offensive sights and odors. The use of these harness and receptacle type devices, however, has been somewhat limited by costs and complications of production and most principally, by the lack of comfort generally afforded the animal when fitted into existing designs.

SUMMARY OF THE INVENTION

Accordingly, it is a general purpose and object of the present invention to provide an improved waste collecting device that can be comfortably worn by dogs or like animals and used to dispose of the collected waste matter in a sanitary manner.

Another object of the present invention is to provide a sanitary device to be worn by a dog or like pet that will allow for safe and easy disposal of fecal waste without disturbing the dog or inconveniencing the pet owner.

Still another object of the present invention is to provide a disposable means for collecting fecal waste directly discharged from a pet dog and removing it in a clean and expeditious fashion without distressing or disturbing the dog.

A still further object of the present invention is to provide an effective waste collecting device that may be used upon a wide variety of breeds and sizes of dogs and that is relatively simple and inexpensive to manufacture.

Briefly, these and other objects of the present invention are accomplished by an improved waste collecting device for dogs and like animals. The device comprises an adjustable harness constructed to fit about the torso of a variety of dog sizes having a back strap intended to extend from the neck to the rump area of the dog and a pair of lateral straps attached along the back strap to releasably fasten the harness about the neck and waist of the dog. A tail strap assembly is further provided on the harness and is adapted to be adjustably fastened along the rearward length of the back strap for holding a waste receptacle assembly in proper position. The waste receptacle assembly is fastened to bifurcated support straps around the tail of the dog and includes a disposable collection bag and a specially configured bag holder intended to support and maintain the bag in a position resting immediately adjacent to the dog's rectum. A semi-circular band of a semi-rigid material incorporated about the upper edge of the bag holder permits the holder to be fastened to the back strap in symmetrical fashion along the curved surface of the band with the flat surface thereof resting just beneath the rectum in a proper position comfortable to the dog.

For a better understanding of these and other aspects of the present invention, reference may be made to the following detailed description taken in conjunction with the accompanying drawing in which like reference numerals designate like parts throughout the figures thereof.

DESCRIPTION OF THE PREFERRED EMBODIMENT

Figure 1:
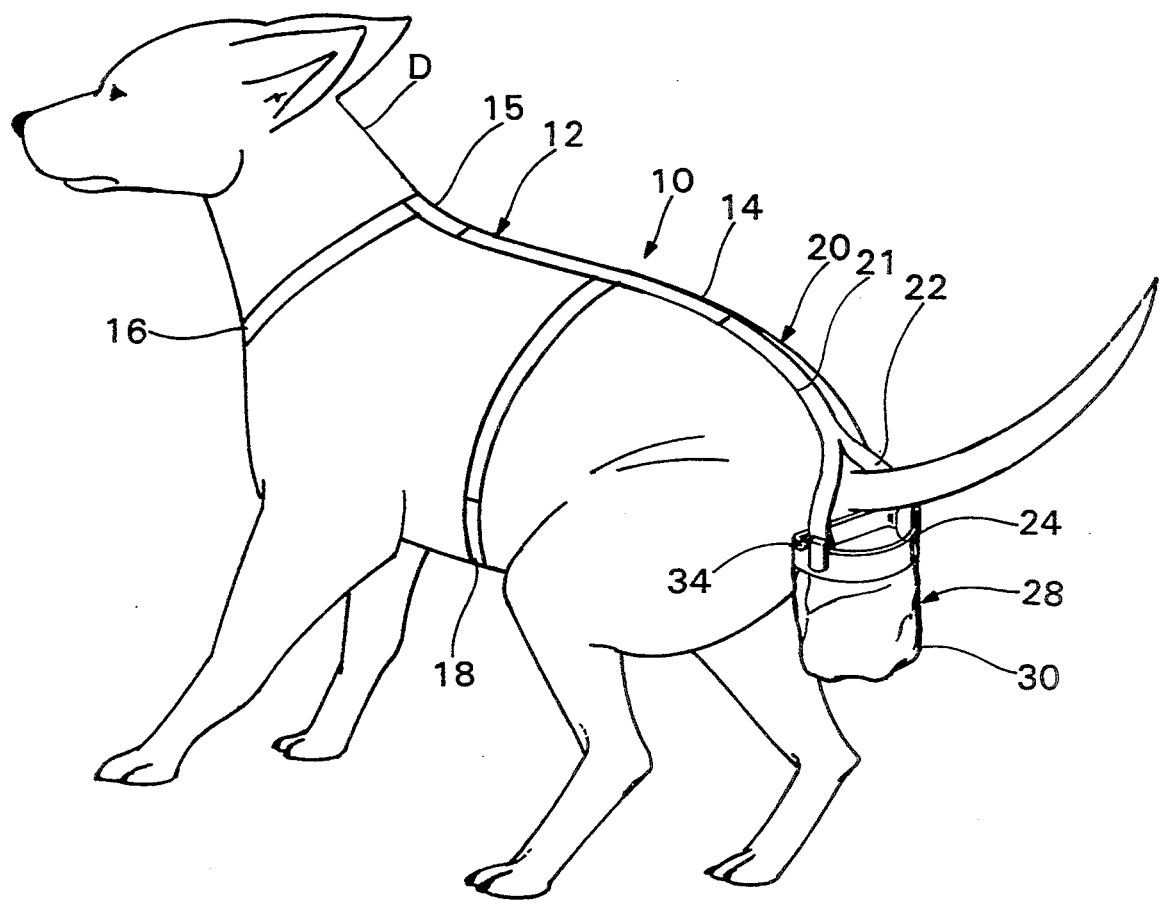
FIG. 1 is a rear perspective view of a dog wearing a waste collecting device in accordance with the present invention.

Referring now to the drawings and at first to FIG. 1, a preferred embodiment of a waste collecting device, made in accordance with the present invention and generally designated 10, is shown fitted upon a dog D.

Waste collecting device 10 comprises an adjustable harness 12 fitted to the dog D or like animal and a detachable waste receptacle assembly 28 fastened to the end of the harness in such a way as to rest freely and comfortably in proper position beneath the rectal area of the dog.

Figure 2:
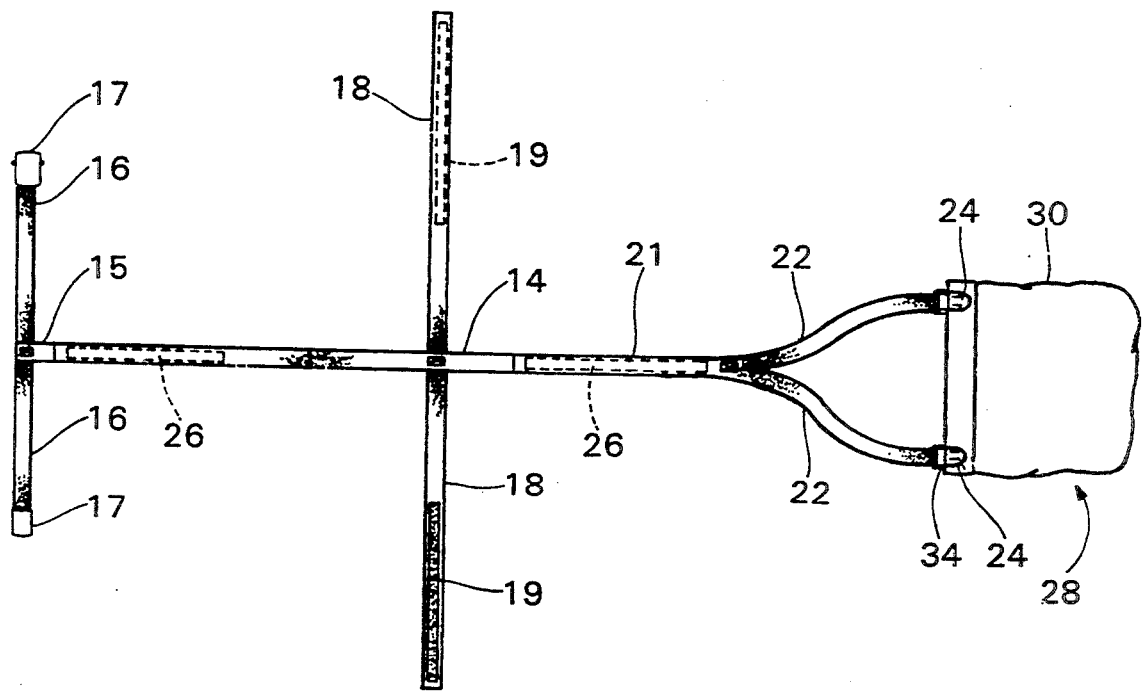
FIG. 2 is a plan view showing the waste collecting device of FIG. 1 in lay-out.

Referring now to FIG. 2 in conjunction with FIG. 1, the harness 12 is formed of multiple straps, as detailed hereinbelow, each made of a soft but strong and flexible webbing material, such as nylon fabric, that may be cut in predetermined patterns, hemmed and seamed, as required. The harness 12 includes an elongated back strap 14 intended to extend centrally along the back of the dog D between its neck and tail. At the forward end of harness 12, a neck strap 15 similarly extends longitudinally along the back of the dog to fasten to the front end of back strap 14. Using a Velcro fastener 26 or the like upon respective surfaces, the neck strap 15 is releasably fastened to the front end of back strap 14 and may be adjusted in its extension relative thereto so that the front end of the neck strap may always be positioned proximate to the nape of the neck regardless of the size of the dog. A neck band 16 of similar material to the back and neck straps, 12 and 14 respectively, is laterally disposed and attached to the front end of the neck strap by sewing or the like. The neck band 16 engages about the neck of the dog D and holds the harness 12 in place using a buckle 17 or like fastener attached to each end of the neck strap.

Across the approximate middle of the back strap 14, a waist strap 18 is attached using sewing or like means of attachment. The waist strap 18 is disposed to extend laterally from the back strap 14 and is formed having sufficient length to completely encircle the torso of the dog D between its front and rear legs. Velcro fasteners 19 are secured in opposition to each other along either end of the waist strap 18 so that the waist strap may adjustably and releasably engage around the dog D and thereby further secure the harness 12 in place.

The harness 12 is further provided with a tail strap assembly 20 adjustably fastened along the rearward end of back strap 14. The tail strap assembly 20 comprises a length of tail strap 21 adapted to engage the back strap 14 and extend therefrom longitudinally along the back of dog D. Using an extended Velcro fastener 26 or the like fixed along respective opposed surfaces, the tail strap 21 is releasably fastened to the rearward end of back strap 14 and may be adjusted in its extension therefrom so that the rearward end of the tail strap may be positioned just above the tail of dog D. A pair of support straps 22 are attached to the rearward end of tail strap 21 by sewing or like means of attachment and are disposed in a bifurcated relationship extending downward from the tail strap in a Y-like manner intended to branch around the dog's tail. Clip fasteners 24 are positioned at each end of the support straps 22 and are attached thereto for detachably mounting the waste receptacle assembly 28.

The waste receptacle assembly 28 includes a bag holder 30 having an open top end specially configured to rest immediately adjacent to the dog's rectal area for receiving the fecal waste discharged therefrom. A semi-circular support band 32, better shown in FIGS. 3-4 and described in greater detail hereinbelow, is incorporated into the open top end of bag holder 30, lining the opening and providing the configuration thereof. The bag holder 30, made of a flexible and durable material, such as vinyl, is constructed similarly to a pouch and may be seamed and closed at its bottom end, as shown in the drawing figures. In the use of the present invention, a disposable collection bag 34, commercially available having a closure means along its top edge, is contained within bag holder 30 as an interior lining therefor and overlaps the open end thereof so that it may be held in its place within the bag holder by clip fasteners 24. It should be noted that the points of attachment for clip fasteners 24 are along the outer curved edge of the open end of bag holder 30 on either side so that the flat inner edge of the open end is urged symmetrically and comfortably against the rear of the dog D just beneath its rectal area.

Figure 3:
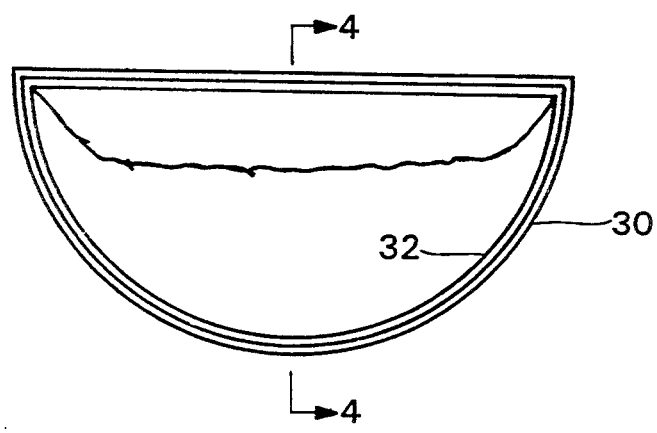
FIG. 3 is a top view of the bag holder of the present invention shown removed from the waste collecting device of FIGS. 1-2 and without the collection bag contained therein.
Figure 4:
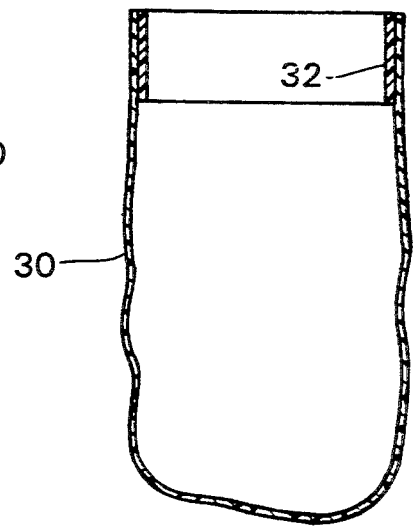
FIG. 4 is a partial cross-sectional view of the bag holder of FIG. 3 taken along the line 4—4 therein.

Referring now to FIGS. 3 and 4, the semi-circular configuration of the open end of bag holder 30 is shown with support band 32 attached to and lining the upper portion of the holder thereby providing said configuration. The support band 32 is made of a semi-rigid plastic material formed having a relatively thin wall that allows the band to flex and deform slightly when urged upon in a radial direction. This element of a rigid lining with radial flexibility provided by support band 32 is particularly important both in handling and in comfortably positioning the bag holder 30 relative to the dog D, specifically allowing the flat inner edge of its open end to deform slightly inward when urged against the dog's rectal area. The support band 32 is attached to the interior of the bag holder 30 by conventional means, such as by means of glue or appropriate cement, and may vary in its radial dimensions depending upon the size of the dog D. The height of the support band 32 may too vary provided the shape of the open end of bag holder 30 is maintained.

Once fitted upon the dog D, the harness 12, which does not confine the front or hind legs, may be worn regularly without discomforting the dog. When necessary to use the device 10 of the present invention, the dog owner can simply mount the bag holder 30 containing disposable bag 34 to the free ends of the tail strap assembly 20 using clip fasteners 24 to engage the outer edge of the open end of the bag holder. After its use and the collection of the dog's waste, the owner, if desired, can lift the bag holder 30 upon the free ends of the tail strap assembly 20 above the tail of the dog D and there detach the bag holder and remove the interior bag 34 for disposal. Alternatively, the owner can detach the bag holder 30 in its resting position beneath the tail and thereafter dispose of the interior bag 34.

Therefore, it is apparent that the disclosed invention provides an improved waste collecting device that can be comfortably worn by dogs or like animals and used to dispose of the collected waste matter in a sanitary manner. This sanitary waste collecting device worn by a dog or like pet can allow for safe and easy disposal of fecal waste without disturbing the pet or inconveniencing the pet owner. Furthermore, the disclosed invention provides a disposable means for collecting fecal waste directly discharged from a pet dog so that the waste can be removed in a clean and expeditious fashion without distressing or disturbing the dog. In addition, the present waste collecting device may be used upon a wide variety of breeds and sizes of dogs and is relatively simple and economical to manufacture.

Obviously, other embodiments and modifications of the present invention will readily come to those of ordinary skill in the art having the benefit of the teachings presented in the foregoing description and drawings. For example, support band 32 may be parabolic in its curved configuration, rather than semi-circular, as shown and described. It is therefore to be understood that various changes in the details, materials, steps, and arrangement of parts, which have been described and illustrated to explain the nature of the invention, may be made by those skilled in the art within the principle and scope of the invention as expressed in the appended claims.

What is claimed:

1. A device for collecting waste from a dog or like animal, comprising in combination:
   a harness having a first plurality of strap members interconnected to extend longitudinally along the back of the dog between the neck and tail thereof and a second plurality of strap members attached to said first plurality of strap members and laterally disposed relative thereto at the neck and central trunk of the dog, said first plurality of strap members including a bifurcated strap member resting rearwardmost along the dog and around the tail thereof;
   waste receptacle means detachably mounted to said harness and supported upon said bifurcated strap member so that said means is urged immediately beneath the rectal area of the dog, said waste receptacle means comprising a flexible bag holder and a semi-rigid support band attached to and lining the upper end of said bag holder to provide a radially flexible semi-arcuate opening at the top thereof, said opening having a flat surface intended to face inwardly to the rectal area of the dog and an arcuate outer surface.

2. A waste collecting device according to claim 1, wherein said support band is semi-circular in shape.

3. A waste collecting device according to claim 1, wherein said support band is parabolic in the semi-arcuate shape thereof.

4. A waste collecting device according to claim 1, wherein said bag holder is further constructed in the form of a pouch having a closed bottom end.

5. A waste collecting device according to claim 4, further comprising:
   a bag member contained within said bag holder and removable therefrom, said bag member having an open top edge adapted to engage the semi-arcuate opening for receiving and disposing the waste.

6. A waste collecting device according to claim 1, wherein each of said first plurality of strap members is adjustable in the effective length thereof when interconnected longitudinally.

7. A waste collecting device according to claim 6, wherein said second plurality of strap members comprises:
   a neck strap attached across the front of said harness and adjustable in the effective length thereof; and
   a waist strap attached across substantially the middle of said harness and adjustable in the effective length thereof.

* * * * *